United States Patent

Arndt

[15] 3,642,492
[45] Feb. 15, 1972

[54] METHOD OF PREPARING A SIMULATED SKIM MILK

[72] Inventor: Robert H. Arndt, St. Louis, Mo.
[73] Assignee: Ralston Purina Company, St. Louis, Mo.
[22] Filed: June 1, 1967
[21] Appl. No.: 642,676

[52] U.S. Cl. ................................................99/64, 99/17
[51] Int. Cl. ...............................A23c 11/00, A23j 1/14
[58] Field of Search ..........................................99/64, 98

[56] References Cited

UNITED STATES PATENTS

| | | | |
|---|---|---|---|
| 2,881,159 | 4/1959 | Circle et al. | 260/123.5 |
| 3,001,875 | 9/1961 | Sair | 99/17 |
| 3,303,182 | 2/1967 | Sakai et al. | 260/123.5 |

FOREIGN PATENTS OR APPLICATIONS

| | | | |
|---|---|---|---|
| 70,049 | 12/1959 | India | 99/64 |

OTHER PUBLICATIONS

Altschul, Processed Plant Protein Foodstuffs, Academic Press, Inc., New York, 1958, pp. 281-282, 288, and 408-410.

*Primary Examiner*—A. Louis Monacell
*Assistant Examiner*—William A. Simons
*Attorney*—Price, Heneveld, Huizenga & Cooper

[57] ABSTRACT

A method of preparing a commercially acceptable, nutritious substitute for dry skim milk as a food additive, comprising the basic steps of pretreating sweet dairy whey, separately pretreating isolated vegetable protein, particularly soy protein, by a dynamic physico-thermo-vapor flash treatment to remove objectionable flavors and odors, blending these pretreated ingredients in a certain controlled ratio, and adjusting the hydrogen ion content to a specific controlled range. The product is preferably flash dried to a powder.

9 Claims, No Drawings

METHOD OF PREPARING A SIMULATED SKIM MILK

BACKGROUND OF THE INVENTION

This invention relates to a food product and a method of making such, and more particularly to a unique food product substitute for dry skim milk as a food additive, and to a special method of preparing a unique substitute food product for dry skim milk, such that the novel product has appearance, flavor, and functional characteristics of dry skim milk, while being particularly nutritious and capable of production at a relatively low cost.

Even in countries having a relatively plentiful supply of dairy products, the cost of such has constantly increased to an extent where the purchase of dry skim milk as an additive for other food products has almost become prohibitive. Consequently, substitutes for dry skim milk have been made from other lower cost milk derivatives. However, the cost of these is also steadily increasing. Further, in many countries, dairy products are not plentiful, while vegetable products such as soybeans, safflower seeds, sesame seeds, peanuts, flax seeds, cotton seeds or the like, are readily grown and plentiful. Moreover, since products like soybeans are largely used for extraction of oil, the remaining byproducts that are rich in protein are readily available but generally unexploited as food.

The problem is that no totally acceptable manner of treating such vegetable materials or combining them with supplemental materials have been developed that would render the final product freely interchangeable with dry skim milk. Objectionable flavor is a serious problem. Ineffective moisture retention properties, among others, is another problem, particularly as an additive to products such as bread dough. Unattractive color and appearance is still another problem.

Thus, in spite of the fact that substitutes for skim milk have been proposed over the last several decades, none has really been very acceptable to the food industry or to the public, and none has really been commercially successful. Still the definite need for an economical acceptable substitute for dry skim milk exists.

SUMMARY OF THE INVENTION

The primary objects of this invention are (1) to provide a highly nutritious, completely acceptable, attractive appearing, bland flavored substitute for dry skim milk that can be directly substituted for dry skim milk as a food additive without detracting from the flavor, odor, appearance, or functional characteristics of the ingredients or of the final product, and which can be produced using vegetable protein materials such as soybeans that are readily available and frequently unwanted or nonusable in products of present commercial processes, and (2) to provide a unique method of dependably preparing such a product, on a production basis.

The novel product comprises (a) an isolated vegetable protein, especially isolated soy protein, which is neutralized to a pH range of about 6.2–6.9 with an edible food grade alkaline reagent and is then subjected to physico-thermo-vapor flash pretreatment, and (b) a separately pretreated sweet dairy whey; the two ingredients being blended together in specific proportions, provided with a specific controlled hydrogen ion content, and put into a dry powder form.

The novel method centers around the basic steps of specially pretreating an isolated, neutralized, vegetable protein, preferably isolated soy protein, with a severe physical working, a momentary high temperature heating, and vapor flashing, separately pretreating sweet dairy whey at an elevated temperature; blending the two together in aqueous liquid at certain controlled proportions; preferably adding a whitening agent in the process; adjusting the hydrogen ion content with certain alkaline reagents, to a controlled pH range; and drying the material to a powder for addition to other food materials, especially bread dough. Important specific details of the novel product and process are spelled out hereinafter.

DESCRIPTION OF THE PREFERRED EMBODIMENTS

The novel concept involves a special dynamic heat and pressure treatment of isolated vegetable protein, preferably soy protein, after converting it from a slurry to a suspension by neutralizing, to remove objectionable flavor characteristics, a separate treatment of sweet dairy whey, combining these pretreated materials in the amounts of about 11–25 percent by weight pretreated vegetable protein and 75–89 percent by weight sweet dairy whey, preferably in the range of about 11.5–15 percent by weight of the former and about 85–88.5 percent of the latter, adjusting the pH to a range of 6.6–7.0, preferably 6.7–6.9, with a food grade, alkaline reagent, preferably calcium hydroxide, sodium hydroxide, potassium hydroxide, and/or magnesium hydroxide.

The special dynamic treatment of the isolated vegetable protein is for physically exposing and thermally and physically releasing the objectionable substances from the protein molecular bundles, for subsequent carry off by water vapor with vapor flashing. The preferred mode of achieving this is by use of jet cooking. The intimate violent physical treatment to break up the protein bundles and expose these substances can be practiced by the use of other equipment as for example, by the shearing action of high-pressure pumps, followed by momentary heating in an elevated pressure zone, and then pressure release and flash off. The heating action of the subdivided protein bundles, or the heating plus physical working can be achieved with alternate equipment such as a hot zone flow tube or coil. Such a device causes rapid flow through a constricted tube, one zone of which is exposed to a heat source such as a gas flame. Other alternative apparatuses include apparatus operating on magneto striction principles, apparatus employing radio frequency heating and agitation, electrostatic heating apparatus, supersonic wave devices, film diaphragm vibration equipment, and reso-jet resonating flame apparatus. In fact, one or more of these devices could be combined with the jet cooker to increase the physical working action. Of course, the suspension must be put under a positive pressure in these alternative apparatuses to cause the subsequent vapor lading, i.e., carrying away, of the objectionable substances released.

The suspension is then normally flash dried to a uniform, fine, powderous product. Of the flash drying techniques, spray drying is preferable. During production, instead of this purified isolated vegetable protein being dried and subsequently reliquified at this state, it may be kept in a liquid form.

The isolated protein ingredient normally has a protein content of about 90–94 percent by weight on a dry basis. This protein content can be increased still further.

This ingredient is preferably a soy protein material. In fact, most of the development work for this invention has been conducted using soy material, although the process could be employed with other isolated vegetable proteins including those from peanuts, sesame seeds, sunflower seeds, flax seeds, cotton seeds, and the like.

The product employs isolated vegetable protein resulting from certain preliminary separation operations. These operations will be described with respect to soybean and edible soy protein products because this was the major area of concern for which the invention was developed, and because the invention is particularly suited to the use of soybean materials.

The soybeans forming the starting material are normally flaked to solvent extract the oil, leaving what is commonly called soybean meal or flakes. These defatted flakes normally have a protein content of about 44 percent or 50 percent. In processing them to obtain what is called isolated protein, the proteins and water soluble soyseed components are leached out of the flakes, with the proteins being in a fine colloidal suspension and the soluble components in solution. The proteins are then precipitated out of the aqueous liquor with an acidic reagent, and washed, as is well known.

For the present process, the precipitate is put into water to form a slurry, and the slurry is converted to a stable suspension by the adjustment of the pH to a range of about 6.2–6.9 with a food grade alkaline reagent.

After these operations, the suspension is then given a special dynamic physico-thermo-vapor flash treatment for the product herein described. In the prepared forms of the process when the product is to be used in foods such as bread where water binding capacity is important, this suspension is flash dried as with a spray dryer, and reliquified with water prior to this dynamic treatment. This has been found to increase the water binding qualities of this ingredient as subsequently treated, as explained in detail hereinafter.

Specifically, the suspension, having a controlled range of solids content, is subjected to dynamic physical working, is rapidly and almost instantly dynamically heated to a controlled elevated temperature range, is held at a controlled elevated temperature under a positive pressure for a brief, controlled time interval, after which the pressure is suddenly released to instantly volatilize part of the moisture and cause objectionable components of unknown type to be entrained by the volatilized moisture, both of which are removed from the slurry. This results in the removal of undesired flavor and odor characteristics while resulting in retention of high redispersibility of the material in water above 75 percent, and usually about 85 percent or so. The suspension is then dried, preferably by flash drying, to a white, bland flavored powdered which retains the high dispersibility when later added to an aqueous liquid.

The treatment of the isolated soy protein described in general above will now be described specifically in the following paragraphs.

The soybean meal or flakes resulting from oil extraction contains many ingredients including complex proteins, sugars, fibers, and others. The proteins and sugars are dissolved out of the solids by adding the flakes to an aqueous bath and adding a food grade alkaline material to raise the pH substantially above 7. Typical of such alkaline reagents are sodium hydroxide, potassium hydroxide, calcium hydroxide, magnesium hydroxide or other commonly accepted food grade alkaline reagents. The material is then slurried for a period of time sufficient to put the proteins into a fine stable colloidal suspension and soluble soy components into solution, usually about 30 minutes or so. The resulting liquor solution is separated from the solids, as by passing the material through a screen and/or centrifuging. Preferably, the liquor is then cycled through a clarifier to remove tiny cellular particles.

The soy proteins are then precipitated from the liquor by lowering the pH to an acidic value near or at the isoelectric point of the protein, usually a pH of 4.6–4.9, with the addition of a common food grade acidic reagent such as acetic acid, phosphoric acid, citric acid, tartaric acid, or others. The precipitate is then separated as by centrifuging, and washed with water to substantially remove occluded sugars, except for a small amount of sugar which is practically impossible to remove. The precipitate is then made into an aqueous slurry by adding water.

The slurry is put into a proper suspension form by adjusting the pH to a generally neutral range of about 6.2–6.9, with the addition of an edible, food grade alkaline reagent, preferably sodium hydroxide, potassium hydroxide, magnesium hydroxide, calcium hydroxide, or mixtures thereof.

The suspension to be further processed should have a controlled solids content of about 3–30 percent by weight, and preferably about 5–17 percent by weight. If it falls below about 3 percent, subsequent processing steps are not economically advisable when a continuous process is employed. Drying is particularly costly. Above about 17 percent solids content, the resulting product does not subsequently lend itself to the preferred flash drying techniques, such as spray drying using a jet or spinning thrower, to result in a product that is not as desirable in its functional characteristics. Above about 30 percent solids content, brownish discoloration of the product tends to occur during the processing.

Each tiny portion of this suspension is then subjected to a physico-thermo-vapor flash treatment including dynamic, practically instantaneous heating to a controlled elevated temperature range, and dynamic physical working, both preferably performed almost simultaneously. Currently, the most satisfactory way of achieving this is to pass the suspension at high velocity through a device commonly known as a Jet Cooker as noted previously. It includes adjacent jet nozzle orifices, normally concentric, through which the suspension and the pressurized steam used as a heating agent are ejected at high velocities in intersecting flow patterns. Each tiny bit of suspension is instantly dynamically heated by the steam while practically simultaneously being subjected to severe physical forces at the nozzle and by the impacting steam. The physical working of each tiny portion is believed to molecularly expose to further action, certain obnoxious substances held to the twisted protein molecules, and this physical working with the elevated temperature heat treatment is believed to weaken and/or break the tenacious bond between these noxious substances and the complex protein molecules to an extent where these substances can be laded away by flashed off vapors, as described hereinafter. The temperature range to which the suspension is heated for the desired results is about 220°–400 °F., although the temperature should not be in the lower region of this range unless the product is subsequently vented into a vacuum chamber after being held under pressure in a special holding chamber explained hereinafter. Normally the temperature should be about 285°–320°F. for best results.

The product is introduced to the jet cooker nozzle at a positive pressure. This pressure should be at a value near the pressure of the steam injected into the suspension, should be sufficient to cause high velocity discharge of the slurry through the jet nozzle, and must be greater than the pressure in a pressure retention chamber positioned immediately downstream of the nozzle. Normally the steam pressure is about 80–85 p.s.i.g., the suspension line pressure is slightly above the steam pressure, usually about 85–100 p.s.i.g., and the discharge pressure in the chamber downstream of the nozzle is about 75–80 p.s.i.g. The pressure drop of the suspension across the nozzle is about 5–15 p.s.i., depending upon these other pressures, with 6–10 p.s.i. being common.

The time interval of the suspension in the nozzle is estimated to be about one second or less. The nozzle orifice for the slurry is small, being only a fraction of an inch, e.g., about one-eighth inch, so that the suspension solids are subjected to severe dynamic, physical working during passage. The steam intermixes intimately with the solids in the ejected suspension. The amount of steam required is not great, normally being an amount which lowers the solids content of the suspension only about 1–2 percent by weight.

Preferably the nozzle orifices are concentric, with the suspension being ejected from the center orifice, for example, and the steam from a surrounding annular orifice oriented to cause its output flow path to intersect the output flow path of the center orifice. The suspension and steam could be ejected from the alternate orifices however. Further, the adjacent orifices need not necessarily be concentric to obtain this interaction.

As noted previously, the steam and suspension are ejected into a special retention chamber. This may comprise an elongated tube through which the intermixed suspension and steam moves from the jet nozzle on one end of the tube to a pressure controlled discharge on the other end. The size and configuration of this chamber are not really critical. The discharge can be controlled by a conventional preset pressure release valve to enable continuous process flow from the nozzle to and out of the discharge valve. This valve regulates the pressure in the holding chamber. The pressure in this chamber must be great enough to prevent any significant vaporization of the moisture in the chamber, even though the temperature is well above the boiling point of water. A pressure of about 75–80 p.s.i.g. readily achieves this. Since suspension and steam must continuously flow into this pressurized chamber, the pressure behind the suspension and the steam must be greater than the chamber pressure to cause this continuous flow.

The heated suspension is retained in the holding chamber for a definite but relatively short time period of a few seconds up to a few minutes, normally of about 7 seconds to about 100 seconds. It is only necessary to retain the product in this heated condition for a few seconds for optimum product. The time is not too critical in this range, although the longer the suspension is held, the greater the likelihood of undesired gelation of the product with subsequent release of pressure, particularly at higher temperatures of treatment.

The pressure on the suspension is then instantly released by discharging the suspension to a reduced pressure zone, into a suitable receiving means that is normally at or near atmospheric pressure or below. This discharging operation is normally progressive for the suspension that passes progressively through the chamber. This discharge and sudden pressure release causes "flash off" of a portion of the moisture in the form of water vapor which is laden with the entrained odiferous, obnoxious, characteristic, pungent chemical components or substances of unknown composition from the soy product. The flash off also causes substantial cooling of the remaining suspension because of the heat of vaporization absorbed from the suspension, so that the total time for which the product is subjected to elevated temperatures is actually very short and controlled. Removal of the substance-laden vapors from the product removes the objectionable flavor and odor characteristics.

This special treatment of the vegetable protein not only removes objectionable odor and flavor, but also importantly causes retention in the product of the property of high dispersibility in water possessed by the raw material. In fact, the dispersibility usually decreases only a few percent. Conventional treatments of such materials normally lowers dispersibility down to values of about 20 percent or so. If the final product is to be used in baking bread or in other products where moisture binding capacity is important, the vegetable protein is preferably subjected to drying and reliquifying prior to this physico-thermo-vapor flash treatment as noted previously. This added drying and reliquification lowers dispersibility several percent while still keeping it relatively high, e.g., about 75 percent, and also increases water binding capacity considerably. This latter factor is significant to bakery products since it strongly affects tenderness and other characteristics of the baked product. The complete technical explanation of this change is not fully understood, but the difference in properties does exist.

The reduced pressure zone into which the suspension is discharged is normally at atmospheric pressure, but it may be subatmospheric, i.e., at a partial vacuum. In either case, the vapors should be instantly conducted away from the suspension, preferably by moving a current of air across the suspension or by drawing a continuous vacuum on the discharge zone to draw the vapors away. The vapors may be specially condensed in a fashion to positively remove the condensate from the area of the collected discharged suspension. In production, the suspension may be discharged from the back pressure control discharge valve directly into a vessel in the open atmosphere where the vapors are allowed and/or caused to rise directly away from the suspension and are prevented from condensing in a manner to allow the condensed substance to flow back into the product. To assure complete removal of the vapors from the purified suspension without allowing the vapors to recondense back into the suspension, the suspension and vapor should be separated from each other immediately after discharge, i.e., immediately after pressure release. In this regard, it is undesirable to cause passage of both components through a common conduit downstream of the discharge valve, and if such is done, it should be minimal.

The resulting purified slurry is whitish and attractive in appearance.

This purified suspension should then have a maximum solids content of about 20 percent by weight, since a higher solids content creates difficulty in subsequent processing due to high viscosity. Such a suspension is actually a dispersion in the nature of a solution-suspension, part of the solids being in solution and part in suspension.

The next step is to add the sweet dairy whey which has been previously treated.

The sweet dairy whey is obtained as a byproduct from dairy operations such as production of sweet dairy cheese, e.g., cheddar cheese. It is subjected to a heating operation separate from the other materials. This type of treatment of dairy products such as whey is known, and usually involves heating of the whey in an aqueous liquid at temperatures in the range of about 220°–260° F. (at least above 200° F.) for a short period of time of about 1–15 minutes, to denature the proteins. A significant point to note is that this treatment of the whey is done prior to mixing with the separately treated vegetable protein material. The heated material may be jetted into an evaporator, comparable to conventional vacuumizing treatments of dairy products.

The whey is then in the form of a dry powder, or in liquid form dissolved in water.

This whey is then added to the purified vegetable protein which is preferably a dispersion in water. If the whey is in powder form, the combined product should be heated to about 140° F. to assure complete dissolving of the lactose. The combination of the two ingredients has about 11–25 percent by weight isolated vegetable protein ingredient, about 89–75 percent by weight sweet dairy whey ingredient, with the preferred ranges being 11.5–15 percent of the former and 88.5–85 percent of the latter. The optimum product is about 11.6 percent isolated soy protein and 88.4 percent whey.

Preferably, a small amount of whitening agent is added to the ingredients. The preferred reagent is calcium chloride. The specific amount added is not critical, with about 0.3 parts by weight per 100 parts of the total solids content of the vegetable protein and sweet dairy whey being normal. This may vary between about 0.1–0.5 parts by weight per 100 parts of the protein and whey ingredients. This whitening agent may be added to the isolated vegetable protein ingredient prior to adding the sweet dairy whey.

The pH of the material at this point is usually about 5.9. This must be adjusted to within the range of 6.6–7.0, and preferably 6.7–6.9. This is done by adding a food grade alkaline reagent, the preferred reagent being calcium hydroxide, although sodium hydroxide, magnesium hydroxide, potassium hydroxide, and the like or a mixture of any of these will serve the purpose.

The mixed ingredients are agitated until uniform and free of crystals. The material is then dried, preferably by flash drying, e.g., using a spray dryer, to obtain a powder having a moisture content of about 2 percent or so.

This final product may be used as a substitute for dry skim milk in producing or preparing other food products. It has an attractive appearance like that of dry skim milk. It has no noticeable flavor or odor characteristic of soy. It tastes bland and sweet, like dried skim milk. Its functional characteristics render it an excellent ingredient for adding to foods. Its dispersibility in aqueous liquids in high, i.e., at least about 75 percent. It has good water binding capacity. The product has excellent qualities for a substitute for skim milk in bakery dough, particularly bread, especially when its water binding capacity is increased by the drying and reliquification steps of the isolated neutral soy soy protein prior to the dynamic physico-thermo-vapor flash treatment.

Extensive testing has shown that bread dough prepared with the novel product is comparable to that prepared with nonfat dry milk, i.e., skim milk) at normal levels, e.g., 2 percent and 4 percent of the dough. The baked bread has an aroma and a toasting quality comparable to that containing milk, has greater water absorption properties to result in more tender bread, and has a shorter necessary fermentation time. No characteristic soy flavor or the like is detectable. The product has a high nutritional content. Another important factor is that 33 percent less of the novel product need be added to the dough to give the same results as currently available with all-dairy substituted for dry skim milk.

Basically, therefore, the product exhibits all of the necessary characteristics to serve as an excellent substitute for dry skim milk as a food additive for bakery products, candy products, ice cream type products, and many others.

The basic principles of the novel product and process set forth above will enable anyone having ordinary skill in the art to practice the invention, and if desired, to make controlled variations within the concept. To assure a complete understanding of the invention, the following illustrative examples are set forth.

EXAMPLE 1

A. If raw soybeans are the starting material, the soybeans are flaked and the oil extracted with hexane to give defatted flakes which when ground are called soybean meal.

B. The flakes or meal are added to an aqueous bath and a food grade alkaline reagent, sodium hydroxide, is added until a pH OF 10 is reached. The material is slurried for 30 minutes, and then centrifuged. The soy protein material is precipitated from the liquor by adding acetic acid until the isoelectric point is reached at a pH of about 4.7. Normally, this precipitate is about 90–95 percent protein. The precipitate is washed with water. These preliminary processing steps are generally known.

C. The precipitate is then added to water to make an aqueous slurry of 15 percent solids by weight. The pH of the aqueous slurry is adjusted up to 6.6 with sodium hydroxide to form a colloidal suspension.

D. The suspension is then passed through a jet cooker under a pressure of 85 p.s.i.g., simultaneously with steam ejection from the jet cooker under a pressure of 75 p.s.i.g. The steam heats the slurry almost instantaneously, e.g., in about 1 second, to a temperature of 310° F. The heated suspension is held for seven seconds under the elevated pressure which is high enough to prevent evaporation at that temperature, and then progressive portions of the heated suspension are discharged into a receiver at atmospheric pressure or below, causing flash off of vapors laden with obnoxious smelling and tasting substances. The suspension is cooled by the flash off vaporization. The substance laden vapors are removed from the purified suspension. The suspension is flash dried in a spray dryer to a moisture content of 3 percent to result in a white isolated soy protein powder having a soy protein content of about 90–94 percent on a dry basis, and a water dispersibility of about 85 percent.

E. Separately, sweet dairy whey in aqueous solution is heated to 230° F. for 5 minutes, vacuumized, and spray dried to a powder.

F. Next 11.5 pounds of the treated isolated soy protein is added to enough water to obtain a dispersion of 20 percent by weight total solids, and the material is agitated to provide a stable solution-suspension.

G. Next 87.7 pounds of dry sweet dairy whey is added to the dispersion and the material is heated to about 140° F. to assure complete dissolution of the lactose. Additional water may be added to hasten dissolution of the whey.

H. Then, if desired, 0.3 pounds of calcium chloride whitener is added and blended in.

I. Next an aqueous suspension of calcium hydroxide is added and blended in until the pH is 6.7. The material may be agitated additionally to assure uniformity and freedom of crystals.

J. The product is then spray dried and put into containers for use in food products.

EXAMPLE 2

A–C. A suspension like that in Step C of Example 1 is used, assuming that the preliminary Steps A and B have been performed and with the pH being raised in Step C to 6.8 with a mixture of sodium hydroxide and calcium hydroxide. The suspension is 17 percent solids.

D. The Step D of Example 1 is performed except that the temperature is 320° F.

E. Step E is performed except that the whey is in a liquid concentrate form.

F. Step F is performed except that 15 pounds of soy protein is used, and the dispersion is 18 percent by weight solids.

G. Then the sweet dairy whey concentrate is added until an equivalent of 84 pounds whey solids is added.

H. No calcium chloride whitener is added.

I. Next a suspension of a mixture of calcium hydroxide, magnesium hydroxide, and potassium hydroxide is added until the pH is raised to 6.8.

J. The product is then dried and put into containers for use in foods.

EXAMPLE 3

A–C. Steps A–C of Example 1 are followed and in addition the suspension is spray dried to a powder, and the powder is reliquified in water to a solids content of 12 percent.

D–J. Steps D–J of Example 1 are followed except the product is to be added to bread dough in place of dry skim milk, first at the rate of 2 percent of the dough, and then at 4 percent by weight of the dough.

EXAMPLE 4

The steps in Example 1 is followed except that in Step D the suspension is passed through a high pressure pump which physically works the suspension portions and put it under a pressure of 60 p.s.i., and then through a restricted tube having a hot zone, while still under pressure, where the suspension is rapidly dynamically heated to 280° F., and the suspension is then jetted into a vacuum chamber at a negative pressure of 20 inches of mercury for instant reduction of the pressure and flash off.

Countless additional examples could be presented using various temperatures in the noted range, various percentages of ingredients in the noted ranges, and various equipment, but this would only unduly lengthen this disclosure since those having ordinary skill in the art can readily practice this invention based upon the guidelines given and the foregoing illustrative examples.

In the light of the criteria set forth herein, this invention is intended to be limited only by the scope of the appended claims and the reasonable equivalents thereof.

I claim:

1. A method of preparing a simulated skim milk product comprising the steps of: preparing an aqueous slurry of a neutralized isolated vegetable protein ingredient, having a solids content within the range of 3–30 percent, heating the slurry rapidly to temperatures of about 220° F. to about 400° F., and subjecting it to dynamic physical working, retaining the slurry for a brief period of time under a positive pressure sufficiently high to prevent volatilization of heated water vapor from the heated slurry, suddenly releasing the pressure to cause flash off volatilization of vapor laden with substances that possess undesirable flavor and odor characteristics, separating the vapors from the treated vegetable protein ingredient; mixing said treated vegetable protein ingredient with sweet dairy whey in an aqueous liquid, the vegetable protein ingredient being present in an amount of about 11–25 percent by weight of said mixture, and whey being present in an amount of about 89–75 percent by weight of said mixture; and adjusting the pH of said mixture to within the range of 6.6–7.0.

2. The method in claim 1 including the step of adding a minor amount of an edible whitening agent.

3. The method in claim 1 including the steps of drying the product to a powder.

4. A method of preparing a simulated dry skim milk product comprising the steps of: providing an aqueous suspension of neutralized isolated soy protein ingredient, flash drying said suspension to a powder of neutralized soy protein ingredient, and reliquifying said powder in an aqueous liquid to a slurry having a solids content within the range of 3–30 percent; heating the slurry rapidly to temperatures of about 220° F. to about 400° F., and subjecting it to dynamic physical working, retaining the slurry for a brief period of time under a positive pressure sufficiently high to prevent volatilization of heated water vapor from the heated slurry, suddenly releasing the pressure to cause flash off volatilization of vapor laden with substances that possess undesirable flavor and odor characteristics, separating the vapors from the treated isolated soy protein; blending said treated isolated soy protein ingredient with sweet dairy whey in an aqueous liquid, the isolated soy protein being about 11–25 percent by weight of the solids and whey about 89–75 percent by weight of the solids; adjusting the pH to within the range of about 6.6–7.0 ; and flash drying said product to a powder.

5. A method of preparing a simulated skim milk product comprising the steps of: preparing an aqueous slurry of a neutralized isolated soy protein ingredient, having a solids content within the range of 3–30 percent heating the slurry rapidly to temperatures of about 220° F. to about 400° F., and subjecting it to dynamic physical working, retaining the slurry for a brief period of time under a positive pressure sufficiently high to prevent volatilization of heated water vapor from the heated slurry, suddenly releasing the pressure to cause flash off volatilization of vapor laden with substances that possess undesirable flavor and odor characteristics, separating the vapors from the treated soy protein ingredient; mixing said treated soy protein ingredient with sweet dairy whey in an aqueous liquid, the soy protein ingredient being present in an amount of about 11–25 percent by weight of said mixture, and whey being present in an amount of about 89–75 percent be weight of said mixture; and adjusting the pH of said mixture to within the range of 6.6–7.0.

6. The method according to claim 5 wherein the slurry of isolated soy protein has a solids content within the range of 5–17 percent and said heating is to a temperature in the range of 285°–320° F. with said slurry being retained under pressure for about 7 seconds to about 100 seconds prior to the pressure release.

7. The method in claim 6 wherein said vegetable protein is isolated soy protein in the amount of 11.5 –15 percent by weight of the solids, and said sweet dairy whey is 88.5–85 percent by weight of the solids.

8. The method in claim 6 wherein said pH is adjusted by adding one of the food grade alkaline reagents consisting of sodium hydroxide, calcium hydroxide, potassium hydroxide, magnesium hydroxide, and mixtures thereof.

9. The method in claim 6 including the step of adding a minor amount of an edible whitening agent.

* * * * *